US007813773B2

(12) United States Patent
Yamamoto et al.

(10) Patent No.: US 7,813,773 B2
(45) Date of Patent: Oct. 12, 2010

(54) ELECTRONIC KEY APPARATUS FOR VEHICLE

(75) Inventors: Hiroaki Yamamoto, Hyogo (JP); Akihiko Mori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 821 days.

(21) Appl. No.: 11/257,095

(22) Filed: Oct. 25, 2005

(65) Prior Publication Data

US 2006/0273886 A1 Dec. 7, 2006

(30) Foreign Application Priority Data

Jun. 6, 2005 (JP) ........................... P2005-165834

(51) Int. Cl.
*H04M 1/00* (2006.01)

(52) U.S. Cl. ..................... 455/575.1; 455/569.2; 701/1; 701/2

(58) Field of Classification Search .............. 455/575.9, 455/569.2, 575.1; 340/426.36, 426.35; 701/1, 701/2
See application file for complete search history.

(56) References Cited

U.S. PATENT DOCUMENTS 6,008,722 A * 12/1999 Hirozawa et al. ...... 340/426.35
7,167,084 B2 * 1/2007 Proefke et al. ......... 340/426.18
7,415,271 B2 * 8/2008 Nicolini ...................... 455/423
2004/0199631 A1 * 10/2004 Natsume et al. ............. 709/225
2005/0270138 A1 * 12/2005 Ikeda ........................ 340/5.23

FOREIGN PATENT DOCUMENTS

DE 199 60 260 A1 7/2001
JP 3191607 B2 5/2001
JP 2002-227479 A 8/2002
JP 2003-148019 A 5/2003
JP 3589188 B2 8/2004

* cited by examiner

*Primary Examiner*—Ajit Patel
*Assistant Examiner*—Khai M Nguyen
(74) *Attorney, Agent, or Firm*—Sughrue Mion, PLLC

(57) ABSTRACT

An electronic key apparatus for vehicle includes a vehicle mounted device, and a portable device. The vehicle mounted device operates a controller upon authenticating an ID code of the portable device by communication with the portable device, and includes a first sending/receiving unit, a first memory that stores ID codes to authenticate portable devices, a first CPU that sends a request signal to the portable device, and receives and decodes whether an answer signal matches the ID code, and a driving unit that outputs a control signal. The portable devices includes a second sending/receiving unit, a second memory that stores a unique ID code, and a second CPU that encrypts the unique ID code and sends an answer signal. The vehicle mounted device includes a disablement unit that temporarily suspends use of an ID code, and does not communicate with the portable device with the suspended ID code.

4 Claims, 3 Drawing Sheets

ELECTRONIC KEY APPARATUS FOR VEHICLE

BACKGROUND OF THE INVENTION

1. Field of the Invention

This invention relates to improvements in an electronic key apparatus for vehicle for verifying an ID code by communication between a vehicle mounted device and a portable device for vehicle and locking and unlocking a door, a handle lock, a box or a trunk and starting an engine, etc.

2. Description of the Related Art

Conventionally, in the case of starting an engine or locking and unlocking a door of a vehicle, there were means in which a user inserts a key into a keyhole and rotates the key, or an electronic key apparatus such as the so-called card key in which wireless communication between a vehicle mounted device and a key (a portable device) is conducted without touching the key at all with the key put in a bag or a pocket of a user and an ID code from the portable device is verified against a code stored in the vehicle mounted device and when the ID code matches with the code, a vehicle mounted control device can lock or unlock the door.

Also, in the electronic key apparatus as described above, an ID of the portable device must be previously registered in the vehicle mounted device and its registration method was a method in which after setting in a registration mode by a predetermined procedure using the existing switch, the vehicle mounted device receives a code from the portable device and registers the code.

The Japanese Patent No. 3,589,188 was means in which in communication between a portable device and a vehicle mounted device, for prevention of leaving the portable device in a vehicle room, wireless communication from the vehicle mounted device to the portable device is conducted and when the portable device makes no response, it is recognized that the portable device is not present in the vehicle room. Also, the Japanese Patent No. 3,191,607 was means in which it is necessary to newly register a code of a portable device in a vehicle mounted device because of loss etc. of the portable device and the code can be registered by a simple method. In the case of a conventional mechanical key, some users hid the key in a certain place of a vehicle in consideration of loss or leaving of possession. In case of an emergency, use was made by taking this key out of the hidden place and starting an engine of the vehicle in order to save the day. However, in the case of a type of key for communicating with a vehicle mounted device by a portable device such as a card key, there is a problem that the card key cannot be used as a spare key similar to the mechanical key simply.

Generally, a vehicle is delivered to a user with the vehicle preset so as to be able to cope with plural portable devices. For example, it is assumed that three portable devices of A, B and C are registered and the vehicle is delivered. When the user attempts to drive the vehicle using the portable device of A among them, a series of actions in which a vehicle mounted device issues a request signal for requesting an ID code for verification and when the portable device receives this signal, an ID code corresponding to the request signal is returned as an answer signal are performed. In this case, the actions are performed in the portable device using a built-in battery as a power source generally. Also, the vehicle mounted device does not know which portable device among the three portable devices the user uses, so that the vehicle mounted device issues the request signal to all the available portable devices of A, B and C. Here, when the portable device C is arranged as a spare in a predetermined place of the vehicle and in the range in which the request signal reaches, the portable device makes a response and there are fears that a battery is rapidly consumed wastefully and also, for example, it is decided that the portable device is arranged inside a vehicle room.

SUMMARY OF THE INVENTION

According to an aspect of the present invention, an electronic key apparatus for vehicle includes a vehicle mounted device mounted in a vehicle, and a portable device possessed by a user. When the vehicle mounted device authenticates an ID code of the portable device by conducting communication between the vehicle mounted device and the portable device, the vehicle mounted device operates a controller mounted in the vehicle. The vehicle mounted device includes a first sending and receiving unit that communicates with the portable device, a first memory that stores a plurality of ID codes in order to perform authentication of a plurality of portable devices, a first CPU that sends a request signal to request an ID code to the portable device through the first sending and receiving unit, that receives an answer signal from the portable device, and that decodes whether or not a content of the answer signal matches the ID code stored in the first memory, and a driving unit that outputs a control signal to the controller when the content matches the ID code stored in the first memory. Each of the plurality of portable devices includes a second sending and receiving unit that communicates with the vehicle mounted device, a second memory that stores an ID code unique to the portable device, and a second CPU that encrypts the ID code of the second memory and sends an answer signal when the request signal from the vehicle mounted device is received through the second sending and receiving unit and a received content is a content sent to the portable device. The vehicle mounted device includes a disablement unit that temporarily suspends use of at least one ID code of the ID codes stored in the first memory. The vehicle mounted device does not communicate with the portable device with respect to the ID code whose use is suspended.

Also, it is an electronic key apparatus for vehicle characterized in that a vehicle mounted device has a disablement release unit in which in the case of detecting a predetermined operation of the user in the vehicle, a request signal is sent in order to communicate with a portable device having an ID code set in a disablement state and the portable device responds to this signal and sends an answer signal and the vehicle mounted device receives this answer signal and thereby the disablement state is released.

According to the invention, a portable device can be arranged as a spare in a manner similar to a conventional mechanical key and in case of an emergency, use can be made again as the normal portable device and convenience can be improved.

DETAILED DESCRIPTION OF THE INVENTION

First Embodiment

Figure 1:
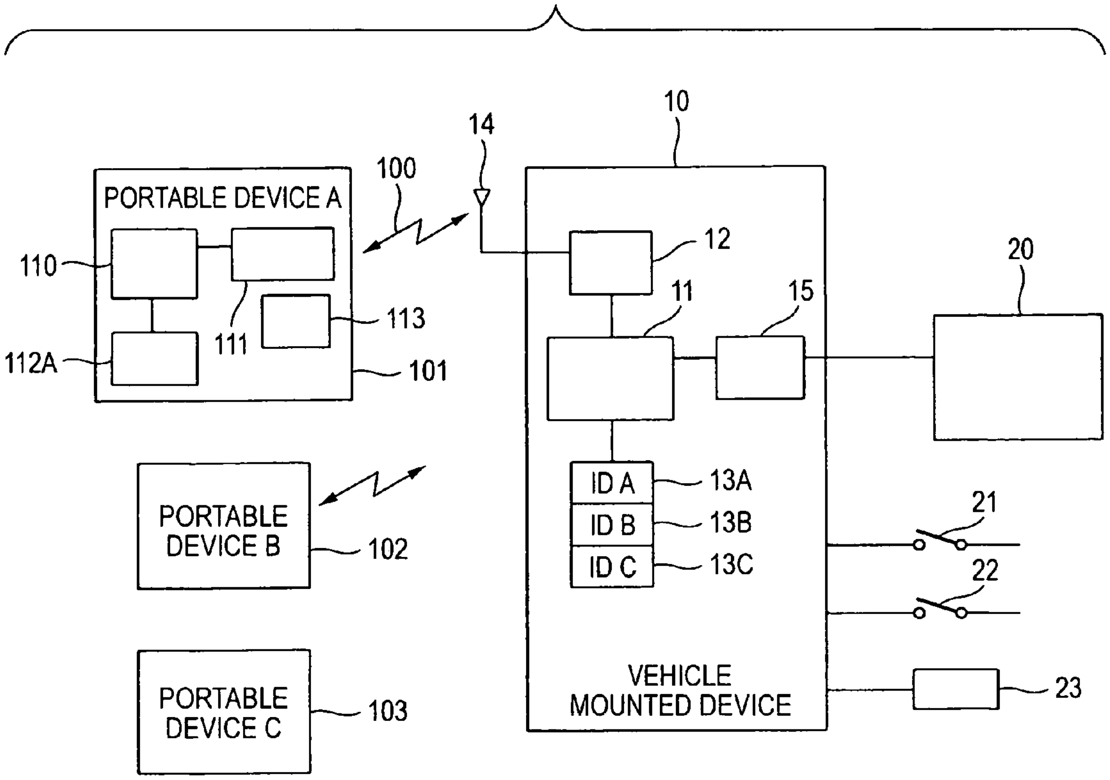
FIG. 1 is the whole configuration diagram of the invention.

A first embodiment of the invention will be described. FIG. 1 shows a concept diagram of the present apparatus, and numeral 10 is a vehicle mounted device disposed in a predetermined place of a vehicle, and numerals 101, 102 and 103 are portable devices A, B and C. The vehicle mounted device 10 includes a first CPU 11, a first sending and receiving unit 12, first memory 13, an antenna 14, and a driving unit 15. Incidentally, the antenna 14 and the sending and receiving unit 12 can also refer to a first sending and receiving unit. Numeral 20 is a controller of the vehicle and is, for example, a door locking and unlocking device or an engine starting device. Numerals 21, 22 are switches mounted in the vehicle, and numeral 23 is a display device. In a basic action of the vehicle mounted device 10, when a user operates the switch 21, the vehicle mounted device 10 detects this and is activated and the first CPU 11 and the first sending and receiving unit 12 operate so as to send a request signal. A request signal 100 is sent to the portable devices 101, 102 and 103 of the user. The portable devices respond to this signal and send an answer signal 100. The vehicle mounted device 10 receives this signal through the antenna 14 and the sending and receiving unit 12. The first CPU 11 decodes the contents of this receiving and reads out IDA (13A), IDB (13B) and IDC (13C) retained in the first memory 13 and performs verification. When the ID retained in the memory matches with the received contents, the first CPU 11 outputs a control signal through the driving unit 15. As a result of this, the controller 20 operates so that, for example, a door is unlocked or engine starting is permitted.

On the other hand, the portable devices 101, 102 and 103 have the same configuration, so that the portable device 101 will be described. The portable device includes a second CPU 110, a second sending and receiving unit 111, second memory 112, and a battery 113. An individual ID is registered in the second memory 112 every portable device. In a basic action of the portable device, the second sending and receiving unit 111 receives a request signal from the vehicle mounted device 10 and the second CPU 110 first decides whether or not to be requested with respect to the self from the contents of its request signal. Since an identification code every portable device is present inside the request signal, an answer signal is not generated at all when it is not requested with respect to the self. When the request signal is intended for the portable device 101 (portable device A), the second CPU 110 reads out an ID code retained in second memory 112A and performs encryption and sends the code from the second sending and receiving unit 111.

Here, the vehicle mounted device 10 does not know which portable device the user uses, so that the memorized codes of all the portable devices are sent as the request signal. However, when the codes are sent to the portable devices unused, both of time and electric power are useless. Further, when the vehicle mounted device 10 communicates with the portable device (103) in the case of hiding the portable device 103 (C) in a predetermined place of the vehicle as a spare key, there are dangers that, for example, a door is not locked or an engine is started when another person attempts to steal the vehicle and starts the engine without having a key. Because of that, a method for erasing the unused ID code from the memory (13C) is contemplated, but when the portable device 101 or the portable device 102 is lost or left, the portable device 103 cannot be used and does not function as a spare key.

Accordingly, it is constructed so that a user does not activate a spare key except when necessary and thereby, the problems are solved when the vehicle mounted device 10 can decide that it seems as if the portable device 103 is absent normally. Further, when the spare key must be used in case of an emergency, it is also necessary to have a return function so that the spare key can be activated.

Figure 2:
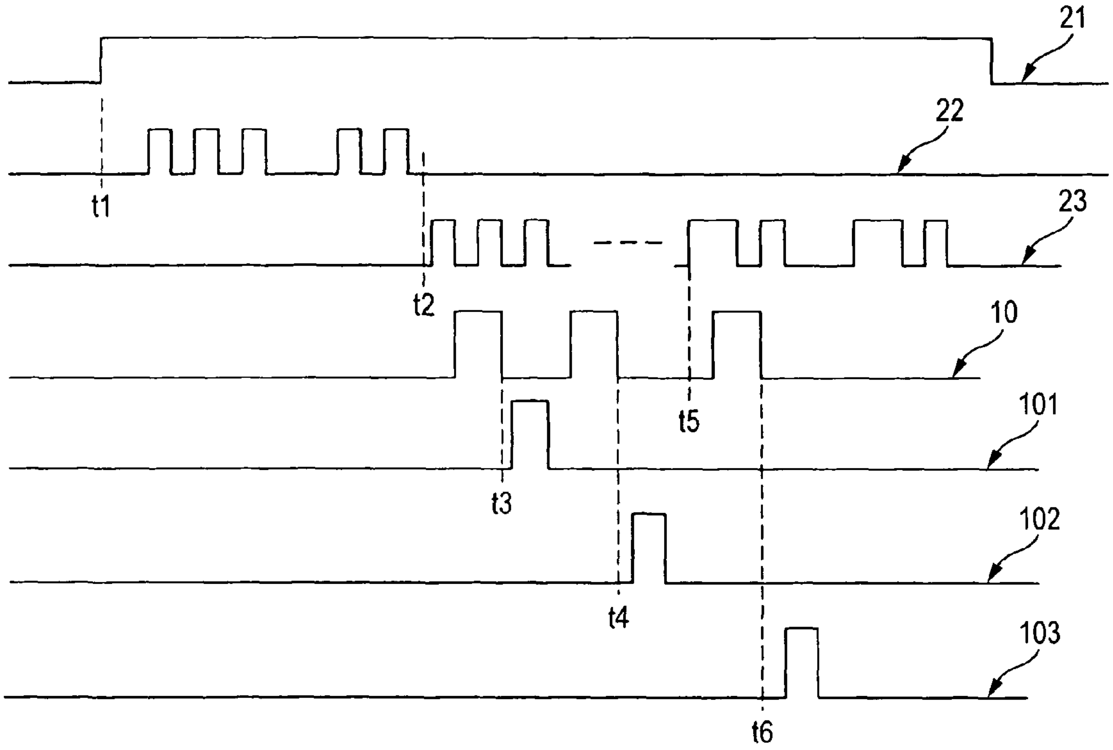
FIG. 2 is a time chart of a first embodiment of the invention.

Therefore, setting made so that the spare key is not activated except when necessary will be first described. FIG. 2 represents a registration method of an ID code of a portable device along time. First, for example, an ignition switch 21 disposed in the vehicle is turned on (t1). Thereafter, predetermined on-off actions of another switch 22 are performed within a predetermined time. In FIG. 2, on-off actions are performed three times and after a while, on-off actions are performed two times (t2). As a result of this, it shifts to an ID code registrable mode and a user can know that it shifts to this ID code registrable mode by the display device 23. In the display device 23, display is performed by performing predetermined on-off blinks when the vehicle mounted device 10 detects that the user has performed predetermined actions of the switches 21, 22.

Next, the vehicle mounted device 10 automatically sends ID codes of the portable devices 101 and 102 registered previously. When the user brings the portable devices 101 and 102, the user cannot return to this sending (t3, t4). The reason why communication with the two (plural) portable devices bothers to be conducted is because there is a danger that the portable device may be stolen for one portable device. When this communication with the two (plural) portable devices is ended within a predetermined time, it shifts to ID code registration. The display device 23 notifies the user of this by changing timing of on-off blinks (t5).

Subsequently, the vehicle mounted device 10 sends a code for registration (t5). When the user brings the portable device 103 which wants to be registered newly, the portable device 103 receives this signal and sends an ID code retained in the second memory to the vehicle mounted device 10 (t6). The vehicle mounted device 10 receives the ID code and stores the ID code in the memory 13C. Heretofore, it is a registration mode and when the registration can be performed, the registration can also be displayed on the display device 23. Finally, the switch 21 is turned off in order to end the registration mode.

Figure 3:
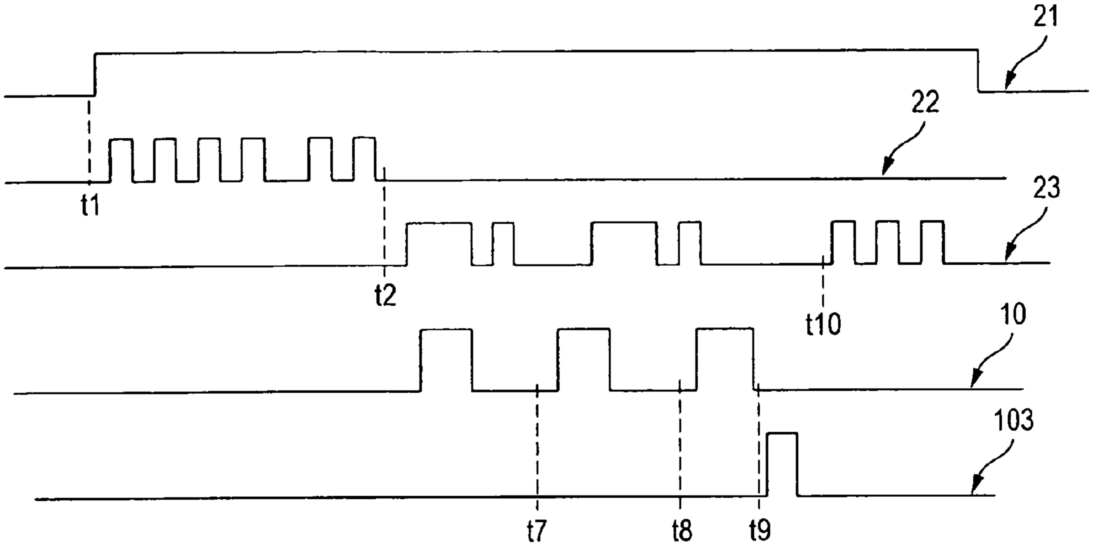
FIG. 3 is a time chart of the first embodiment of the invention.

Next, the case of setting, for example, the portable device 103 (C) among the three registered portable devices as a spare key will be described using FIG. 3. Incidentally, the same numerals as those of FIG. 2 among numerals of FIG. 3 show the same means.

First, the switch 21 is turned on (t1) and predetermined on-off actions of the switch 22 are performed within a predetermined time (t2). The on-off actions of the switch 22 of this time differ from the case of registration and, for example, are a method in which on-off actions are performed two times after on-off actions are performed four times as shown in FIG. 3. As a result of this, the vehicle mounted device 10 recognizes that it is in a spare key setting mode of temporarily disabling an ID code registered, and the display device 23 displays timing of on-off blinks different from the registration mode (t2 to t10) and notifies a user.

In the case of shifting to this spare key setting mode, the vehicle mounted device 10 sends request signals sequentially to all the registered portable devices in order to determine which registered portable device is temporarily disabled as a spare key (t2 to t9). In this case, the user holds only the portable device 103 which wants to be used as the spare key, and thereby there are no returns to sending of the first time (t7) and the second time (t8). Only the portable device 103 can return to the request signal of the third time (t9). When the vehicle mounted device 10 acquires return information about this portable device 103, it is set in a state of temporary disablement with storage of the registered ID code (13C of FIG. 1) held after checking the ID code. Also, the display device 23 indicates that the third portable device is set as the spare key (t10). Here, a disablement unit is implemented by software of the first CPU 11.

In the case of being in this state, the vehicle mounted device 10 sends only two of the registered ID codes of the portable devices to the request signal, and does not send a signal at all to the portable device 103 temporarily disabled as the spare key. As a result of this, even when the portable device 103 is arranged in a predetermined place of a vehicle body of the inside or the outside of a vehicle room, the portable device does not respond and a built-in battery is not used and thus electric power is not consumed. Also, since the portable device is disabled as the spare key, even when the portable device 103 is arranged inside the vehicle room, the vehicle mounted device 10 does not require any response to the spare key and can ignore the spare key for normal actions, for example, permission of engine starting or locking and unlocking of a door. Incidentally, it goes without saying that one normal use key is set and plural spare keys can also be set.

The above description has been made by the ID code, but the so-called wake-up code may be used. In the case that this wake-up code generally invokes (wakes up) the second CPU 110 of a portable device by first calling to the portable device and thereafter an ID code is sent as a request signal and the portable device returns an answer signal, it can similarly be constructed so that this wake-up code is not sent to a portable device set as a spare key.

Second Embodiment

Figure 4:
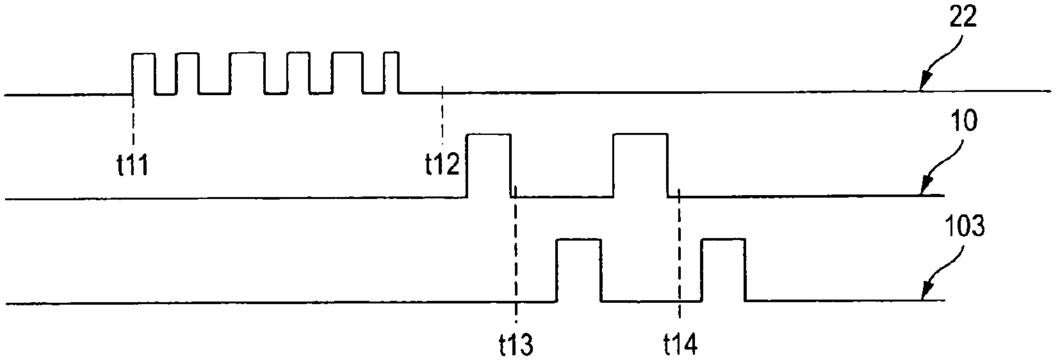
FIG. 4 is a time chart of a second embodiment of the invention.

Next, a second embodiment will be described. A method for returning the function in case of running into a situation in which a portable device 103 once set as a spare key must be used will be described herein using FIG. 4. First, a user does not hold portable devices 101, 102 and takes out a portable device 103 hidden. Next, the user approaches a driving seat door and operates a door switch (for example, a switch 22) by the operation different from a normal action. It can shift to the present mode by, for example, continuously performing predetermined on-off actions two or more times within a predetermined time (t11 to t12). Here, on-off actions are performed five or more times for one second. When a vehicle mounted device 10 detects this switch operation (t12), it shifts to a return mode of returning a function of the spare key, and an ID code (13C of FIG. 1) of the spare key is sent as a request signal (t13). By this sending, the portable device 103 which is the spare key can respond to this. Though it is the spare key, the ID code is registered in memory and the spare key can be returned simply by only giving a trigger signal to the vehicle mounted device so as to return the ID code of the spare key.

The vehicle mounted device 10 may be constructed so as to first return the spare key by making a check by conducting communications plural times rather than only one communication (t14). By this return action, the spare key can be operated simply in case of an emergency in which the portable devices 101, 102 are left or lost, and the convenience improves. Incidentally, by performing the switch operation different from a normal action, it is constructed so as not to cause a situation in which the spare key is returned by accidentally deciding that it is the case of using the authorized portable devices 101, 102. Here, a disablement release unit is implemented by software of the first CPU 11.

Also, in the disablement release unit, functions of fingerprint, voiceprint and iris verification as well as only a predetermined operation of the switch can be used in order to check a proper user. For example, for a type of portable device 103 having a function of fingerprint verification, only an authorized user can operate the portable device and security can be improved. Also, in a two-wheeled vehicle, there is no door switch, so that, for example, an ignition switch (21) disposed in the vehicle can be used as an alternative. Also, since a vehicle can be started simply for only one switch, it may be further constructed so that plural switches are operated and communication between the vehicle mounted device 10 and the portable device 103 is conducted every the operation and when two or more communications and verifications are ended, the spare key is first used as an authorized key. Furthermore, in return of the spare key, an engine is once started and thereafter the engine is turned off and also it can be retained in memory as the spare key again. In this case, there is an effect capable of eliminating an action of again registering the portable device 103 as the spare key when the authorized portable device 101, 102 shifts to an available state.

The invention can also be used in similar electronic key apparatus of ships, aircraft, etc. as well as vehicles.

What is claimed is:

1. An electronic key apparatus for vehicle comprising:

a vehicle mounted device mounted in a vehicle; and a portable device possessed by a user, wherein when the vehicle mounted device authenticates an ID code of the portable device by conducting communication between the vehicle mounted device and the portable device, the vehicle mounted device operates a controller mounted in the vehicle, the vehicle mounted device includes:

a first sending and receiving unit that communicates with the portable device;

a first memory that stores a plurality of ID codes in order to perform authentication of a plurality of portable devices;

a first CPU that sends a request signal to request an ID code to the portable device through the first sending and receiving unit, that receives an answer signal from the portable device, and that decodes whether or not a content of the answer signal matches the ID code stored in the first memory; and a driving unit that outputs a control signal to the controller when the content matches the ID code stored in the first memory, each of the plurality of portable devices includes:

a second sending and receiving unit that communicates with the vehicle mounted device;

a second memory that stores an ID code unique to the portable device; and a second CPU that encrypts the ID code of the second memory and sends an answer signal when the request signal from the vehicle mounted device is received through the second sending and receiving unit and a received content is a content sent to the portable device, the vehicle mounted device includes:

a disablement unit that temporarily suspends use of at least one ID code of the ID codes stored in the first memory, and the vehicle mounted device does not communicate with the portable device with respect to the ID code whose use is suspended, wherein use of the at least one ID code which has been suspended by the disablement unit is allowed only when the user performs a predetermined operation via an apparatus disposed on the vehicle, wherein at least one switch is disposed in the vehicle, and when the vehicle mounted device detects that the user has performed a first predetermined operation of the switch, the vehicle mounted device conducts a communication with the portable device, evaluates by the communication the ID code whose use is suspended from the ID codes stored in the first memory, and sets the ID code in a disablement state.

2. The electronic key apparatus for vehicle as claimed in claim 1, wherein the vehicle mounted device includes:

a disablement release unit that, when a predetermined operation of the user in the vehicle is detected, sends a request signal in order to communicate with the portable device having an ID code set in a disablement state, and, in accordance with a reception by the vehicle mounted device of an answer signal sent from the portable device having an ID code set in a disablement state and responding to the request signal, releases the disablement state.

3. The electronic key apparatus for vehicle as claimed in claim 1, wherein when a disablement release unit receives an ID code in which a disablement state is released, the vehicle mounted device returns a function of the portable device to a normal state, and also when the vehicle is operated by the portable device and then the operation is stopped, the vehicle mounted device automatically returns the function again to the disablement state.

4. The electronic key apparatus for vehicle as claimed in claim 1, wherein the vehicle mounted device includes:

a display unit that notifies the user when at least one portable device is set in a disablement state or is set in a disablement release state.

* * * * *